(12) United States Patent
Andler et al.

(10) Patent No.: US 12,099,336 B2
(45) Date of Patent: Sep. 24, 2024

(54) METHOD FOR DETECTING AN OBSTACLE IN AN ACCESS DEVICE

(71) Applicant: Gebr. Bode GmbH & Co. KG, Kassel (DE)

(72) Inventors: Daniel Andler, Niestetal (DE); Guido Bachmann, Guxhagen (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 813 days.

(21) Appl. No.: 17/179,914

(22) Filed: Feb. 19, 2021

(65) Prior Publication Data

US 2021/0270074 A1  Sep. 2, 2021

(30) Foreign Application Priority Data

Feb. 28, 2020 (DE) .......................... 102020105319.3

(51) Int. Cl.
| | |
|---|---|
| *E05F 15/40* | (2015.01) |
| *B61D 19/00* | (2006.01) |
| *E05F 15/41* | (2015.01) |
| *E05F 15/60* | (2015.01) |

(Continued)

(52) U.S. Cl.
CPC ............ *G05B 17/02* (2013.01); *B61D 19/005* (2013.01); *E05F 15/41* (2015.01); *B60J 5/047* (2013.01); *B60J 5/0486* (2013.01); *B60J 5/0497* (2013.01); *E05Y 2201/434* (2013.01);
(Continued)

(58) Field of Classification Search
CPC ....... G05B 17/02; E05F 15/41; B61D 19/005; B60J 5/047; B60J 5/0486; B60J 5/0497; E05Y 2201/434; E05Y 2400/30; E05Y 2400/54; E05Y 2900/51
See application file for complete search history.

(56) References Cited

U.S. PATENT DOCUMENTS

| | | | |
|---|---|---|---|
| 6,064,165 A | 5/2000 | Boisvert et al. | |
| 6,636,814 B1 * | 10/2003 | McCullers | G05B 23/0283 |
| | | | 701/19 |
| 2002/0180269 A1 | 12/2002 | Dalakuras et al. | |

(Continued)

FOREIGN PATENT DOCUMENTS

| | | | |
|---|---|---|---|
| CN | 110717379 A | * | 1/2020 |
| DE | 10045341 A1 | | 4/2002 |

(Continued)

*Primary Examiner* — Chico A Foxx
(74) *Attorney, Agent, or Firm* — CANTOR COLBURN LLP

(57) ABSTRACT

A method for state-based maintenance of an access device of a vehicle, in particular of a public transport vehicle, wherein the access device includes a moveable element and an electric drive for moving the moveable element and is attached to the vehicle. The drive is controlled with control signals, wherein actual state signals for describing the state are generated based on a detected state of the access device. The control signals are applied to a physical simulation model for computationally simulating the access device and determining expected target state signals and wherein based on a comparison between the actual state signals and associated target state signals, a maintenance state of the access device is determined. The simulation model is adjusted based on the comparison between the actual state signals and the associated target state signals.

13 Claims, 1 Drawing Sheet

(51) Int. Cl.
*G05B 17/02* (2006.01)
*B60J 5/04* (2006.01)
(52) U.S. Cl.
CPC ....... *E05Y 2400/30* (2013.01); *E05Y 2400/54* (2013.01); *E05Y 2900/51* (2013.01)

(56) References Cited

U.S. PATENT DOCUMENTS

| | | | | |
|---|---|---|---|---|
| 2003/0062865 | A1* | 4/2003 | Mullet | E05F 15/668 318/445 |
| 2007/0016332 | A1* | 1/2007 | Tyni | B66B 5/0037 700/47 |
| 2011/0005689 | A1* | 1/2011 | Coleman | H02H 7/0851 318/434 |
| 2012/0090242 | A1* | 4/2012 | Bocquet | E06B 9/68 49/506 |
| 2017/0310261 | A1* | 10/2017 | Goetzelmann | H02P 23/0031 |
| 2022/0114817 | A1* | 4/2022 | Gronau | G06V 10/454 |

FOREIGN PATENT DOCUMENTS

| | | | | |
|---|---|---|---|---|
| DE | 102017130002 A1 * | 6/2019 | | E05F 15/632 |
| DE | 102019211611 A1 | 2/2021 | | |
| EP | 2015156 A1 | 1/2009 | | |
| EP | 3499470 A1 | 6/2019 | | |
| WO | 2011004578 A1 | 1/2011 | | |
| WO | 2011005678 A2 | 1/2011 | | |

* cited by examiner

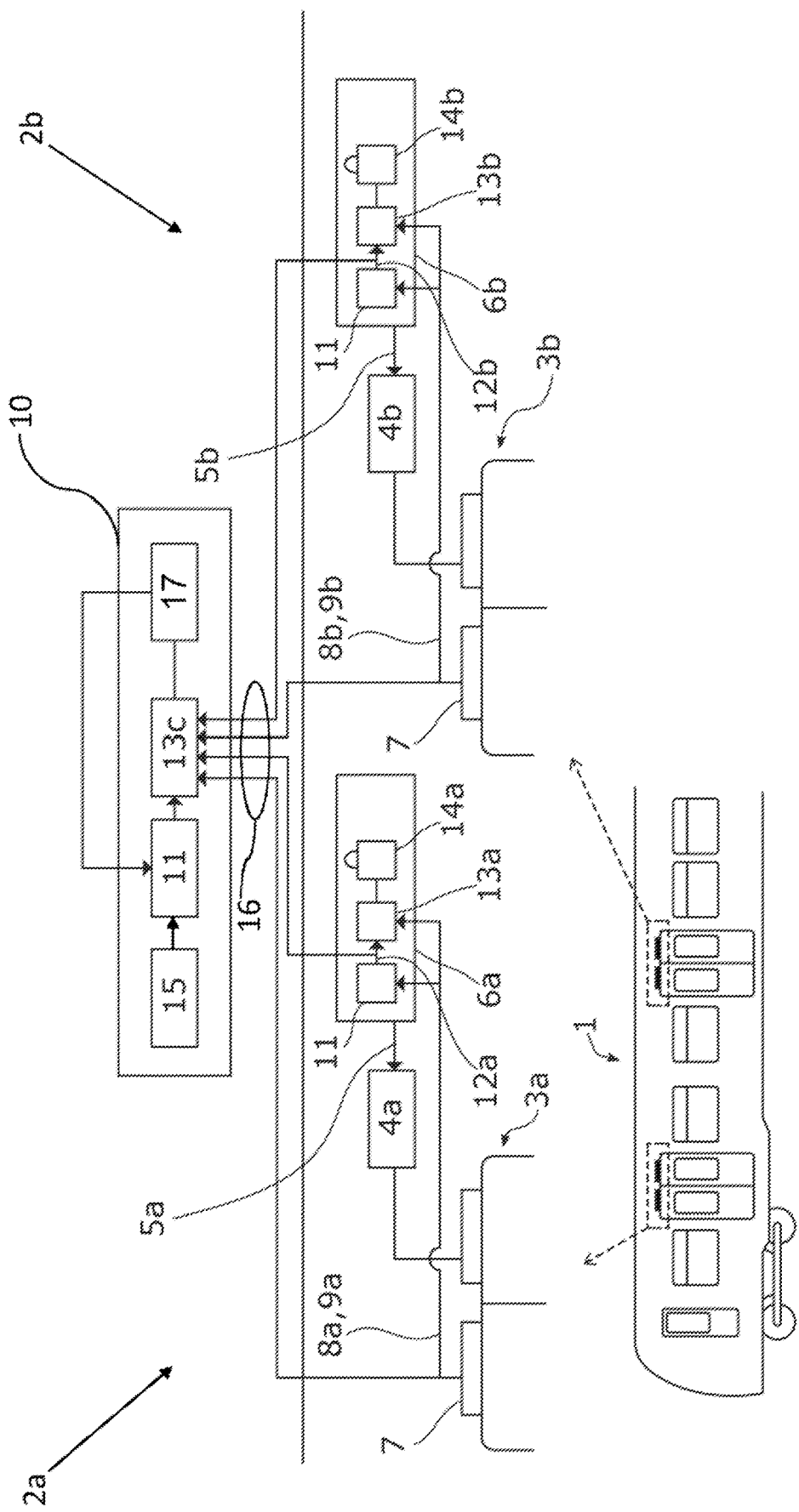

METHOD FOR DETECTING AN OBSTACLE IN AN ACCESS DEVICE

CROSS REFERENCE TO RELATED APPLICATIONS

This application is related to and claims the benefit of German Patent Application No. 102020105319.3, filed on Feb. 28, 2020, the contents of which are herein incorporated by reference in their entirety.

TECHNICAL FIELD

The disclosure relates to a method for detecting an obstacle in an access device of a vehicle.

BACKGROUND

Access devices such as sliding doors in particular in public transport vehicles often have an obstacle detection system. This functionality is intended to detect an obstacle in the movement path or travel distance of the movable element during the movement of a moveable element such as a door leaf of the access device. Obstacle detection of this type can, on the one hand, be carried out by means of sensors such as pressure sensors or a light barrier which can directly detect the presence of an obstacle. Another approach to obstacle detection, which can be used alternatively or in addition to the use of a direct sensor, involves evaluating state signals of the access device. In the case of an electric drive, this can be the voltage applied and a measured current through the drive, for instance. These state signals can then be compared with pre-defined thresholds which, for example, describe a range for a movement of the moveable element without any obstacles. If the state signals are then outside of this range, the presence of an obstacle is detected. Subsequently, the further movement of the moveable element can be stopped and, if necessary, a return movement away from the obstacle can be initiated.

A disadvantage of this approach is that the effects of a degradation of the access device are not taken into account. In principle, degradation occurs in practically all technical devices with increasing operating time, which sooner or later causes a failure and thus leads to the entire device or major parts of the device having to be repaired or replaced before it is possible and permitted to operate the device further.

But even in the early stages of degradation, which in themselves do not require repair or maintenance of the access device, changes in the behaviour of the access device already occur.

SUMMARY

The present disclosure provides improved methods for detecting an obstacle in an access device of a vehicle such that the effects of degradation of the access device can be better taken into account for the obstacle detection.

Based on a method for detecting an obstacle in an access device of a vehicle, this advantage is achieved by means of the features of claim 1.

Essential to the disclosure is the knowledge that a computational model for simulating the behaviour of the access device, which model provides the basis of comparison for obstacle detection, need not be assumed to be fixed at a constant value, but rather can itself also be adjusted in the course of degradation of the access device. The adjustment of the model is expressed in particular in a modification of the predictions of the model. The values processed for obstacle detection can thus be compared with reference values or thresholds, which are not fixed but rather are correspondingly adjusted in the course of the determined degradation of the access device.

The method according to the disclosure is intended to detect an obstacle in an access device of a vehicle. This vehicle can be a public transport vehicle. According to the method according to the disclosure, the access device comprises a moveable element and an electric drive for moving the moveable element and is attached to the vehicle, wherein the drive is controlled with control signals for moving the moveable element. According to the disclosure, actual state signals for describing the state are generated based on a detected state of the access device, wherein the control signals are applied to a physical simulation model for computationally simulating the access device and determining expected target state signals. The simulation model is used for the simulation and modelling of physical states, but is not itself physical as it includes data, possibly in combination with algorithms.

The expression "actual state signals" should be understood here as being state signals for describing a detected and thus actual state. In contrast, the "target state signals" describe a state expected in accordance with the simulation model. According to the method according to the disclosure, based on a comparison between the actual state signals and associated target state signals, an obstacle state is detected during the movement of the moveable element.

There are usually at least two obstacle states which can be detected, namely "obstacle detected" and "no obstacle detected". However, in principle, there can be any number of obstacle states which can be detected. Every obstacle state can also correspond to a respectively different probability that there is an obstacle.

In the method according to the disclosure, the simulation model is adjusted based on the actual state signals and the associated target state signals. Such an adjustment means that different target state signals are determined following adjustment at least for some control signals than before the adjustment of the simulation model. In other words, the adjustment leads to the simulation model, understood as a function, providing a modified illustration between the input and output values. The simulation model is preferably adjusted based on a possible further comparison between the actual state signals and the associated target state signals.

Since the simulation model itself goes through the degradation and thus life cycle of the access device through these possibly repeated adjustments, it can also be described as the digital twin of the access device.

In principle, the criteria for triggering this adjustment can be chosen arbitrarily. There is thus usually no adjustment of the simulation model if the actual state signals substantially fully correspond to the associated target state signals. In this case, it should be assumed that the simulation model in its current state depicts the access device sufficiently accurately.

The simulation model is then preferably adjusted if the comparison between the actual state signals and the target state signals fulfils a pre-defined criterion. In particular, the simulation model may be adjusted if a deviation between the actual state signals and the target state signals exceeds a pre-defined threshold. If there is a sufficiently large deviation between the measured actual state signals and the target state signals determined by the simulation model, this may suggest that the simulation model no longer indicates the actual conditions sufficiently accurately and should therefore be adjusted. In this case, further criteria can be used to distinguish whether such a deviation is due to the presence of an obstacle or to degradation.

The type of adjustment of the simulation model is also, in principle, arbitrary. A plurality of criteria are preferably pre-defined and the simulation model is preferably adjusted differently in each case depending on which of the plurality of predefined criteria is fulfilled. The criteria can respectively correspond to a certain state and in particular a certain degradation state of the access device such that when a certain criterion is fulfilled, the simulation model is adjusted in such a way that it corresponds to the assigned degradation state.

In principle, the simulation model can also be adjusted by creating a new simulation model. It may thus be the case that the adjusted simulation model has no direct relationship with the simulation model prior to adjustment. It can, however, also be the case that the possibility of an adjustment is already provided for in the simulation model itself. One preferred embodiment of the method is thus characterized in that the simulation model is a parametrized simulation model such that the target state signals are determined based on at least one parameter for describing a degradation of the access device. The degradation state described by the simulation model is then simply described by such a parameter. The parameter is preferably a numerical value or a tuple of numerical values. This parameter can, in principle, be chosen arbitrarily. It is preferable that the at least one parameter for describing a degradation of the access device comprises at least one energy parameter for describing an energy consumption of the access device during the movement of the moveable element. The energy consumption during the movement can provide an easily measurable indication of the degree of degradation A further preferred embodiment of the method is characterized in that the at least one energy parameter comprises a closing energy parameter for describing an energy consumption of the access device during a closing operation of the access device. The movement of the moveable element can accordingly be a closing movement of the moveable element. An increase in the energy required can in particular be caused by greater friction during the movement of the moveable element. In this context, it is preferable that the closing energy parameter describes a loss of friction during the closing operation of the access device.

In principle, the observations on the closing operation can also be applied to the opening operation. According to one preferred embodiment of the method, it is envisaged that the at least one energy parameter comprises an opening energy parameter for describing an energy consumption of the access device during an opening operation of the access device. The movement of the moveable element is then preferably an opening movement of the moveable element. It is further preferable that the opening energy parameter describes a loss of friction during the opening operation of the access device.

In this context, there may also be more than one parameter provided for describing the degradation. According to a further preferred embodiment of the method, it is therefore envisaged that the target state signals are determined based on a plurality of parameters for describing a degradation of the access device.

The access device can in particular be a door system, wherein the moveable element can then be a door leaf. The access device can also be a sliding step system, wherein the moveable element can be a sliding step in this case.

In principle, the simulation model can have any origin. A further preferred embodiment of the method is characterized in that the simulation model was generated from design data for describing the access device. In other words, this is data from which the access device could be or actually has been manufactured in whole or in part. Manufacturing of this type should be understood in general terms and can comprise the production, assembly, joining or other connection of individual parts. These individual parts form at least one part of the access device and it may be the case that characterizing data is provided in the design data for these individual parts. It may also be the case that, based on specifications in the design data, correspondingly specified individual parts were manufactured and then assembled.

The simulation model can be any data, including special formulaic relationships and special numerical approaches, which are used for the computational simulation of the access device. It is sufficient here that only certain features or measured variables of the access device are simulated. Similarly, this simulation does not, in principle, require a specific accuracy to be achieved. The simulation model can, on the one hand, comprise fixed calculation algorithms which are then only parametrized by variable data. However, the simulation model can also be variable both in terms of its parameters and also the calculation approaches. This can concern both the way in which certain physical processes are computationally modelled as well as the selection of numerical solution approaches for these models. As well as the control signals, the simulation model can also provide for further input variables and here in particular the actual state signals. According to one preferred embodiment, it is therefore envisaged that the actual state signals are also applied to the physical simulation model for computationally simulating the access device and for determining expected target state signals.

One preferred embodiment is characterized in that the simulation model has at least one conversion table for determining the expected target state signals based on the control signals, preferably also based on the actual state signals. Such a conversion table is also called a lookup table. It enables the target state signals to be determined very quickly and without using a large number of resources.

In principle, it may be the case that the simulation model has only been generated from the design data, i.e. that no measurements or tests on a real access device have been included in the simulation model. According to one preferred embodiment of the method, however, it is envisaged that the simulation model has been complemented by measurements on a sample of the access device by measurements being carried out on the sample of the access device before attachment to the vehicle. The reference to a sample of the access device illustrates that the measurements or tests were not necessarily carried out on the same access device, in the sense of the same sample, the drive of which according to the proposed method is controlled with control signals and the state of which is detected for generating the actual state signals. It is therefore sufficient that the measurements or tests were carried out on an access device similar to the access device actually in operation.

In principle, the simulation model can be generated from the design data on which the production of the access device as a whole was based. According to a further preferred embodiment of the method, it is, on the other hand, envisaged that the design data have a combination of individual design elements, in that the design elements are assigned a respective element simulation model for describing the design element and in that the generation of the simulation model comprises the combination of the respective element simulation models of the design elements. In this case, it is further preferred that the access device has components which correspond to the design elements. In other words, the simulation model is not created as a whole from the design data, but rather at least partially from the element simulation models of the design elements which are part of the design data. The real components corresponding to the design elements—as virtual elements in the design data—are comprised by the real access device. This preferred embodiment reduces the complexity of determining the simulation model because the respective models of the individual components can be consulted.

One preferred embodiment of the method is characterized in that at least some of the element simulation models were obtained by applying mechanical and/or electrical formulas to element design data of the design element from a program for computer-assisted design. In other words, the element simulation models are not based on measurements or tests on the real components, but rather on calculations based on the properties of the only virtual design element. In this way, an element simulation model can be used even before a corresponding real component has been manufactured. The abovementioned program can be a program for computer-assisted mechanical and/or electrical design.

In principle, the simulation model can be adjusted at any time with regard to the actual operation of the access device. According to one preferred embodiment of the method, it is, however, envisaged that the simulation model is adjusted during an ongoing operation of the access device.

In principle, the generation of the control signals, the application to the simulation model for determining the expected target state signals and the adjustment of the simulation model can occur in one and the same computing device. However, these processes can also, in principle, be distributed to any number of individual computing devices. According to one preferred embodiment of the method, it is specifically envisaged that the vehicle has an electronic control device for controlling the access device with the control signals as well as a central processing unit connected to the control device via a network, that the control signals, preferably also the actual state signals, are transmitted via the network to the central processing unit and that the central processing unit applies the control signals, preferably also the actual state signals, to the simulation model for determining the expected target state signals and adjusts the simulation model.

The central processing unit is preferably arranged on the vehicle. The network is preferably a local network. Alternatively or in addition, it can be a wireless network. A local network should be understood here as any, in particular also wireless, connection between two different electronic devices. In other words, the local network goes beyond a purely device-internal data connection. In this case, the local network can have any topology and in particular can also comprise the direct connection of two network nodes. A wireless network in the present sense can also be a network that merely partially provides for wireless transmission. The wireless network can also be a mobile radio network.

In principle, the actual state signals can come about in any way. One preferred embodiment of the method is characterized in that the vehicle has a measuring arrangement for generating measurement signals based on a measurement on the access device. These can be any types of measurements and thus in particular physical, mechanical or electrical measurements. It is further preferable that the actual state signals comprise the measurement signals at least partially.

In other words, such measurement signals can also as such be understood as actual state signals. Alternatively or in addition, it may be the case that the actual state signals are generated at least partially based on the measurement signals, and in particular by the control device. In this case, at least some actual state signals correspond to further processing or evaluation of the measurement signals.

The above actual state signals can also be used at least indirectly for generating the control signals, for example in the scope of a control loop. Accordingly, a further preferred embodiment of the method is characterized in that a control program runs on the control device, which program generates the control signals for controlling the drive based on feedback signals. The feedback signals can be comprised by the actual state signals. The feedback signals can also be the above measurement signals such that the control signals for controlling the drive are generated based on the measurement signals. It is also preferable that the feedback signals comprise a coding signal for specifying a position of the movable element or comprise the coding signal.

The simulation model is preferably adjusted with a time delay from the detection of the obstacle state. In this way, computer resources can be used more uniformly.

Such a time delay also facilitates the consideration of several access devices for the adjustment of the respective simulation model by a single central processing unit. A further preferred embodiment of the method is thus characterized in that respectively different time delay durations between the respective detection of the obstacle state and the adjustment of the simulation model are provided for the plurality of access devices attached to the vehicle. In fact, the respective moveable element of the access devices often moves substantially simultaneously, for example when reaching a stop on the route of a public transport vehicle. Such a substantially simultaneous movement is regularly followed by longer times when there is no such movement such as during a journey of the public transport vehicle.

In principle, the control signals can be any signals for controlling the drive. Therefore, they can be digital signals for controlling the drive, for instance. According to a further preferred embodiment of the method, it is envisaged that the control signals comprise a motor voltage to be applied to the electric drive. The control signals preferably comprise the motor voltage.

Likewise, both the actual state signals and the target state signals can, in principle, be any types of signals. It is preferable here that the actual state signals and the target state signals comprise a motor current flowing through the electric drive. On the one hand, this is an actually measured motor current and, on the other hand, an expected motor current.

One preferred embodiment of the method is characterized in that the detected state of the access device comprises a movement sequence divided into movement phases during the movement of the moveable element and in that the actual state signal is compared with the expected target state signal based on respectively different characteristic signal characteristics for at least one movement phase. Accordingly, it is preferable that the determination of the expected target state signals is also based on the movement phases of the movement sequence. If a characteristic course of a signal is expected over a period of time, a deviation between the actual state signal and the expected target state signal can be identified more precisely. By way of example, it may be the case that the movement sequence is divided into an acceleration phase, a continuous phase and a braking phase during the movement of the movable element. By paying attention to typical courses during the respective phase transition, the delayed or premature start of such a phase can, for example, be effectively identified. Such an approach is easier to implement than, for example, a comprehensive comparison over the entire period of time of the movement sequence.

A further preferred embodiment of the method is characterized in that the detection of the obstacle state during the movement of the movable element is based on the movement phases of the movement sequence. In other words, when the actual state signals are compared with the associated target state signals, it is taken into account which movement phase the compared actual state signals and target state signals belong to.

BRIEF DESCRIPTION OF THE DRAWING

Further details, features, objectives and advantages of the present disclosure are explained below based on the drawing which only shows one exemplary embodiment. In the drawing, FIG. 1 schematically shows a vehicle having an access device for executing an exemplary embodiment of the proposed method.

DETAILED DESCRIPTION OF THE DRAWING

The vehicle 1 illustrated in FIG. 1 is a public transport rail vehicle having a plurality of passenger doors attached to the vehicle 1, two of which are shown as access devices 2a, b here, by way of example. Each access device 2a, b respectively comprises a moveable element 3a, b, which is a door leaf in this case. Additionally, each access device 2a, b comprises an electric drive 4a, b—respectively an electric motor here—for moving the door leaf.

The electric drives 4a, b are respectively controlled with control signals 5a, b which emanate from a respective electronic control device 6a, b of the vehicle 1. In the present case, the control signals 5a, b are a motor voltage applied to the drive 4a, b. The vehicle further has a measuring arrangement 7 with a measuring device on each access device 2a, b, which measuring devices generate respective measurement signals 8a, b, which measurement signals 8a, b are respectively a motor current here. These measurement signals 8a, b simultaneously form actual state signals 9a, b here, which in this way reflect a detected state of the respective access device 2a, b.

There is a simulation of the respective access device 2a, b in the electronic control devices 6a, b. In this case, the control signals 5a, b and the actual state signals 9a, b are applied to a physical simulation model 11, which is used for the computational simulation of the respective access device 2a, b. In the present case, the computational simulation is carried out by applying a plurality of lookup tables of the simulation model 11. The target state signals 12a, b are determined by applying the control signals 5a, b and the actual state signals 9a, b to the simulation model 11.

The lookup tables and thus the simulation model 11 were determined based on data stored in the central processing unit 10. Specifically, the simulation model 11 was initially generated from design data 15, wherein the access devices 2a, b were manufactured based on a first part of the design data 15. The design data 15 in turn are made up of individual design elements (not illustrated here), and specifically for each individual electric or mechanical component of the access devices 2a, b. The simulation model 11 and thus also the lookup tables were then generated by the element simulation models corresponding to this combination of the design elements.

The simulation model 11 was then adjusted by means of measurements on the manufactured samples of the access devices 2a, b.

The abovementioned expected target state signals 12a, b are compared with the actual state signals 9a, b in the control devices 6a, b and, depending on the result of the comparison, it is identified whether an obstacle was present or not during the movement of the respective moveable element 3a, b. The presence of an obstacle is in particular detected if the deviation between the actual state signals 9a, b and the target state signals 12a, b exceeds a threshold. This comparison process is schematically illustrated in FIG. 1 by a comparison block 13a, b and the detection of the obstacle state as an output block 14a, b. If the presence of an obstacle is detected, the moveable element 3a, b is moved in the respectively opposite direction of movement such that a release from the obstacle occurs.

As well as determining the maintenance state, a further evaluation of the actual state signals 9a, b and the associated target state signals 12a, b takes place, for the purpose of which the actual state signals 9a, b and the target state signals 12a, b are also sent to the central processing unit 10, which is arranged spaced apart from the vehicle 1. The central processing unit 10 is coupled to the control devices 6a, b via a wireless network 16 in terms of telecommunications. The design data 15 are also shown as being stored in the central processing unit 10. In the central processing unit 10, there is initially a comparison of the actual state signals 9a, b and the target state signals 12a, b, which is illustrated in FIG. 1 as a comparison block 13c. In this comparison, the simulation model 11 and in particular its current parametrization in terms of degradation is also taken into account here. The evaluation of the comparison is illustrated as evaluation block 17.

In this evaluation, the deviation between the actual state signals 9a, b and the target state signals 12a, b is compared with a plurality of staggered thresholds, wherein each threshold respectively forms a pre-defined criterion. The simulation model 11 is adjusted depending on the exceeded threshold and thus fulfilled criterion, wherein it may also be the case with a sufficiently low deviation that the simulation model 11 is not adjusted in this comparison.

Specifically, each fulfilled criterion defines a degradation state of the access device 2a, b, which results in an observable change in behaviour but is not yet inherently faulty. Each degradation state is assigned a parameter. The application of this parameter to the simulation model 11 leads to it taking the degradation indicated by the parameter into account and adjusting itself such that the detected target state signals 12a, b correspond to the degradation according to the parameter.

After such an adjustment of the simulation model 11, both the criteria for detecting an obstacle state and the criteria for determining a further progressive state of degradation are regularly adjusted. In this way, the simulation model 11 forms a so-called digital twin of the access devices 2a, b. The adjusted simulation model 11 with the likewise adjusted criteria is subsequently transmitted to the control devices 6a, b by the central processing unit 10.

The invention claimed is:

1. A method for detecting an obstacle in an access device of a vehicle, wherein the access device comprises a moveable element and an electric drive for moving the moveable element and is attached to the vehicle, wherein the drive is controlled with control signals for moving the moveable element, wherein actual state signals for describing the state are generated based on a detected state of the access device, wherein the control signals are applied to a physical simulation model for computationally simulating the access device and determining expected target state signals and wherein based on a comparison between the actual state signals and associated target state signals, an obstacle state is detected during the movement of the moveable element and wherein the simulation model is adjusted based on the actual state signals and the associated target state signals, wherein the simulation model is a parametrized simulation model such that the target state signals are determined based on at least one parameter for describing a degradation of the access device, in that the at least one parameter for describing a degradation of the access device comprises at least one energy parameter for describing an energy consumption of the access device during the movement of the moveable element, wherein the at least one energy parameter comprises a closing energy parameter for describing an energy consumption of the access device during a closing operation of the access device, in that the closing energy parameter describes a loss of friction during the closing operation of the access device.

2. The method according to claim 1, wherein the target state signals are determined based on a plurality of parameters for describing a degradation of the access device.

3. The method according to claim 1, wherein the simulation model was generated from design data for describing the access device.

4. The method according to claim 3, wherein the simulation model has been complemented by measurements on a sample of the access device by measurements being carried out on the sample of the access device before attachment to the vehicle.

5. The method according to claim 1, wherein the vehicle has an electronic control device for controlling the access device with the control signals as well as a central processing unit connected to the control device via a network, in that the control signals, also the actual state signals, are transmitted via the network to the central processing unit and in that the central processing unit applies the control signals, also the actual state signals, to the simulation model for determining the expected target state signals and adjusts the simulation model.

6. The method according to claim 5, wherein the vehicle comprises a plurality of access devices attached to the vehicle having a respective control device and in that the control signals, also the actual state signals, of the plurality of access devices are transmitted via the local network to the central processing unit for determining the respective expected target state signals and for determining the maintenance condition of the respective access device.

7. The method according to claim 6, wherein a control program runs on the control device, which program generates the control signals for controlling the drive based on feedback signals which are comprised by the actual state signals, based on the measurement signals, further in that the feedback signals comprise a coding signal for specifying a position of the movable element, further comprise the coding signal.

8. The method according to claim 1, wherein the vehicle has a measuring arrangement for generating measurement signals based on a measurement on the access device, in that the actual state signals comprise the measurement signals at least partially and/or in that the actual state signals are generated at least partially based on the measurement signals.

9. The method according to claim 1, wherein the detected state of the access device comprises a movement sequence divided into movement phases during the movement of the moveable element and in that the actual state signal is compared with the expected target state signal based on respectively different characteristic signal characteristics for at least one movement phase.

10. The method according to claim 9, wherein the detection of the obstacle state during the movement of the movable element is based on the movement phases of the movement sequence.

11. A method for detecting an obstacle in an access device of a vehicle, wherein the access device comprises a moveable element and an electric drive for moving the moveable element and is attached to the vehicle, wherein the drive is controlled with control signals for moving the moveable element, wherein actual state signals for describing the state are generated based on a detected state of the access device, wherein the control signals are applied to a physical simulation model for computationally simulating the access device and determining expected target state signals and wherein based on a comparison between the actual state signals and associated target state signals, an obstacle state is detected during the movement of the moveable element and wherein the simulation model is adjusted based on the actual state signals and the associated target state signals, wherein the simulation model is a parametrized simulation model such that the target state signals are determined based on at least one parameter for describing a degradation of the access device, in that the at least one parameter for describing a degradation of the access device comprises at least one energy parameter for describing an energy consumption of the access device during the movement of the moveable element, wherein the at least one energy parameter comprises an opening energy parameter for describing an energy consumption of the access device during an opening operation of the access device, in that the opening energy parameter describes a loss of friction during the opening operation of the access device.

12. A method for detecting an obstacle in an access device of a vehicle, wherein the access device comprises a moveable element and an electric drive for moving the moveable element and is attached to the vehicle, wherein the drive is controlled with control signals for moving the moveable element, wherein actual state signals for describing the state are generated based on a detected state of the access device, wherein the control signals are applied to a physical simulation model for computationally simulating the access device and determining expected target state signals and wherein based on a comparison between the actual state signals and associated target state signals, an obstacle state is detected during the movement of the moveable element and wherein the simulation model is adjusted based on the actual state signals and the associated target state signals, wherein the simulation model was generated from design data for describing the access device, wherein the design data have a combination of individual design elements, in that the design elements are assigned a respective element simulation model for describing the design element and in that the generation of the simulation model comprises the combination of the respective element simulation models of the design elements.

13. The method according to claim 12, wherein at least some of the element simulation models were obtained by applying mechanical and/or electrical formulas to element design data of the design element from a program for computer-assisted design.

\* \* \* \* \*